(No Model.) 2 Sheets—Sheet 1.

H. SCHULZE-BERGE.
HOT BLAST STOVE.

No. 360,973. Patented Apr. 12, 1887.

WITNESSES:
Harry L. Gill,
J. A. Burns,

INVENTOR
Hermann Schulze Berge
BY
Bakewell & Kerr
his ATTORNEYS (No Model.) 2 Sheets—Sheet 2.
H. SCHULZE-BERGE.
HOT BLAST STOVE.
No. 360,973. Patented Apr. 12, 1887.
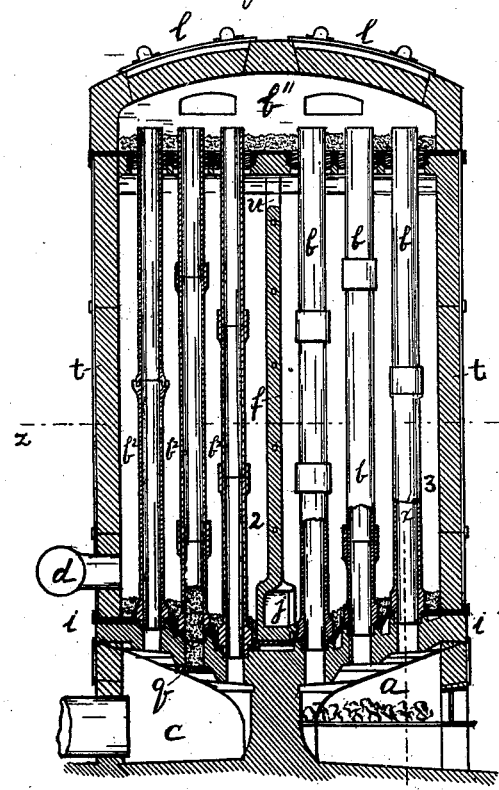
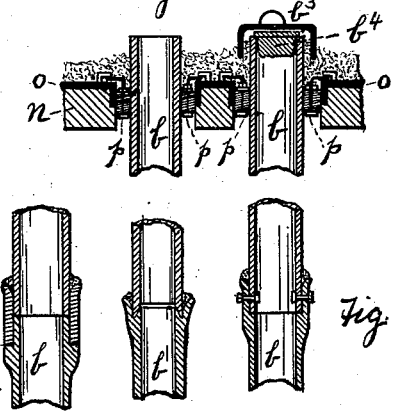
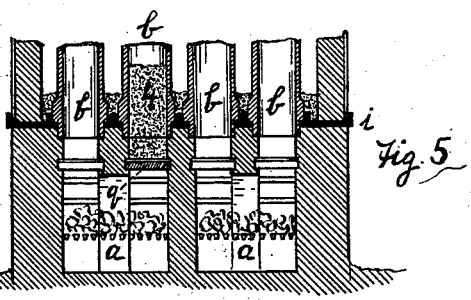
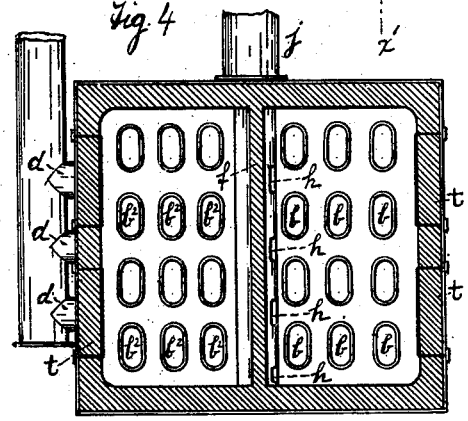
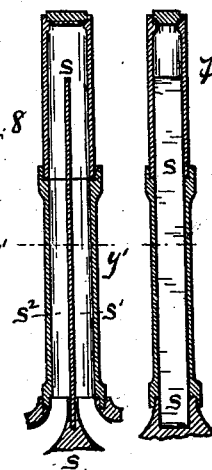
WITNESSES:
Harry L. Gill
J. A. Burns.
INVENTOR
Hermann Schulze-Berge
BY
Bakewell & Kerr
his ATTORNEYS.

UNITED STATES PATENT OFFICE.

HERMANN SCHULZE-BERGE, OF ROCHESTER, PENNSYLVANIA.

HOT-BLAST STOVE.

SPECIFICATION forming part of Letters Patent No. 360,973, dated April 12, 1887.

Application filed February 2, 1885. Serial No. 154,615. (No model.)

*To all whom it may concern:*

Be it known that I, HERMANN SCHULZE-BERGE, of Rochester, in the county of Beaver and State of Pennsylvania, have invented a new and useful Improvement in Hot-Blast Stoves; and I do hereby declare the following to be a full, clear, and exact description thereof.

My invention relates to an improvement in stoves in which a blast of air or gas is heated previously to its being applied to metallurgical or other analogous purposes.

It consists in a novel and useful arrangement of the parts of such stove, whereby its flues can be made of a refractory clay, instead of the usual metal flues now employed.

I will now describe my improvement with reference to the accompanying drawings, in which—

Figure 1:
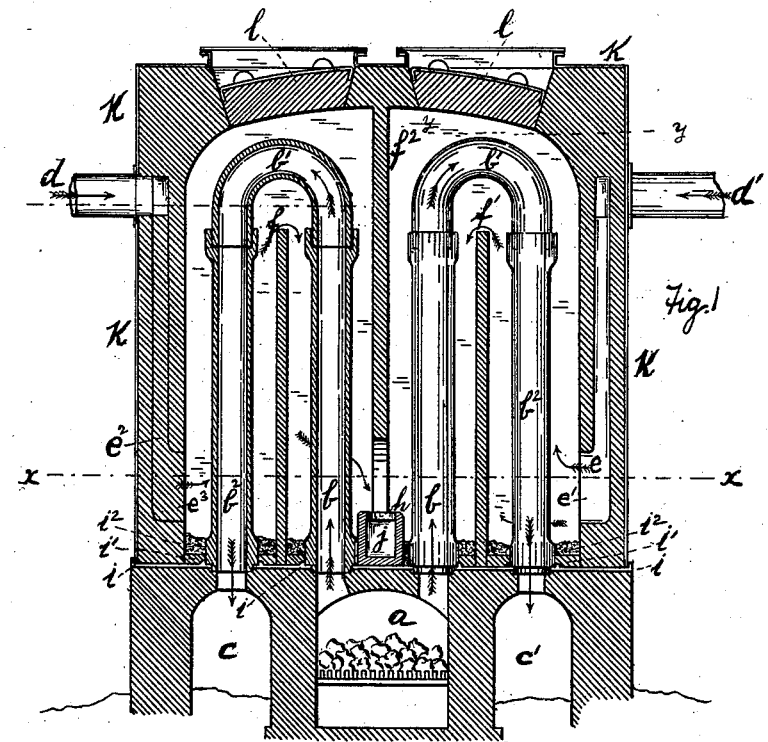
Figure 2:
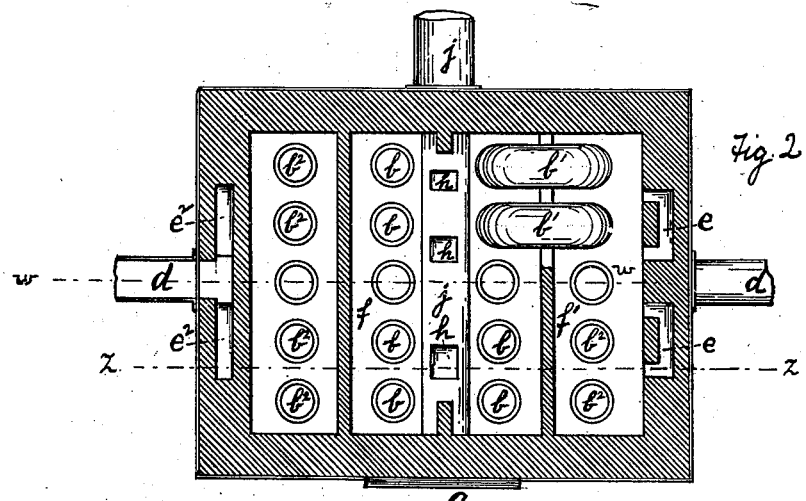

Figure 1 is a view of a hot-blast stove provided with my improvement, being a vertical cross section on the lines $z\ z$ and $w\ w$ of Fig. 2. Fig. 2 is a horizontal cross-section, partly on the line $x\ x$ and partly on the line $y\ y$ of Fig. 1. Fig. 3 is a vertical cross-section of a modification. Fig. 4 is a horizontal section on the line $z\ z$ of Fig. 3. Fig. 5 is a vertical section on the line $x'\ x'$ of Fig. 3. Fig. 6 is a similar section of a part of the same figure. Fig. 7 is a detached sectional view of several of the flue-pipes. Figs. 8 and 9 are vertical sectional views of modified forms of flue-pipe. Fig. 10 is a horizontal cross-section on the line $y'\ y'$ of Fig. 8.

Like letters of reference indicate like parts in each.

As is well known, the operations in metallurgical and glass furnaces are performed more rapidly and with greater economy of fuel the higher the degree of heat which is given to the air used in combustion. In the hot-blast stoves which are now in general use, and in which the air is blown through heated cast-iron pipes, the temperature of the blast can not be made to exceed 700° or 900° Fahrenheit. Any greater heat will injure or destroy the material of which the pipes are composed. In stoves built upon the regenerative principle, with checker-work flues made of refractory bricks, the temperature of the blast can be maintained at 1,000° or 1,300° Fahrenheit. The latter are, however, objectionable because of the expense in their construction and operation, and because they require a continual reversing of their valves. It has been hitherto impossible to combine in the stoves with flue-pipes the advantages of the regenerative stoves in efficiency and of the pipe-flue stoves in cheapness by making the pipe-flues of clay, because such pipes will not stand the necessary pressure of blast when forced through their interiors without breaking, while the porosity of their composition causes them to leak so badly as to be inefficient. I have discovered that these objections are due to the passage of the air-blast through the pipes, which causes them to expand or break, and that it is obviated by subjecting them to external as distinguished from internal pressure. The tendency of the blast is then to compress the clay pipes, while their cylindriform structure will cause them to withstand a very great external pressure without danger of breaking.

My improved stove may be made of any convenient and desirable shape. That shown in the drawings is rectangular in cross-section. The usual combustion-chamber, $a$, is situated in the under part of the stove, and leading from thence to the upper part of the stove, and then down to exit-flues $c\ c'$, are U-shaped flue-pipes $b\ b^2$, made of fire-clay. These are preferably made in pairs of vertical and parallel pipes, the members of each pair being joined by an arched pipe or chamber, $b'$, which is connected with the vertical pieces in a proper way to form the continuous U-shaped flue, before described. (See Fig. 1.) There are any suitable number of these flue-pipes, each pair having one of its legs in communication with the combustion-chamber $a$ and the other communicating with the exit-flues $c$ or $c'$.

The interior of the stove is preferably provided with vertical partitions $f\ f'\ f^2$, whose object is to deflect the air as it is passed through the stove and cause it to assume a circuitous course around the pipes. For this purpose, when there are three partitions, two, $f\ f'$, may be built across the stove, extending from the bottom to within a short distance of the roof, while an intermediate partition, $f$, may be built entirely to the roof, and provided with an opening or openings, $h$, at the bottom for passage of air into a common discharge-pipe.

The operation is as follows: The gases of combustion from the fire-chamber enter the branches $b$ of the gas-flues, pass up the same through the arched pipes $b'$, and thence down the branches $b^2$ into the exit-flues $c\ c'$, whence they are drawn by a suitable chimney-stack.

On one side of the stove, preferably near the crown, is a suitable number of blast-pipes, $d'$, which communicate with a vertical flue, $e$, made in the wall of the stove. This flue has its entrance into the stove at a point near the bottom at $e'$. On the other side of the stove, opposite the blast-pipes $d'$, is a similar series of blast-pipes, $d$, which lead into the stove through a vertical flue, $e^2$, like the flue $e$, before described. The pipes $d\ d'$ are connected with the blowing-engines, and the blast of air from them entering the stove at $e'\ e^3$, after having been more or less heated by contact with the stove in the flues $e\ e^2$, ascends over the partitions $f f'$, and descends on the inner sides thereof. At the base of the middle partition-wall, $f^2$, and on the hearth of the stove, is a horizontal air-pipe, $j$, which is provided with holes $h\ h$, which are directly under the openings $h'$ of the partition $f$, and thus communicate with both parts of the stove. The blast from both pipes $d$ and $d'$, therefore, enters the discharge-pipe $j$ through the holes $h$, and is conveyed thence to the tuyeres of the furnace, with which the pipe $j$ communicates. During the circuitous course of the blast from the pipes $d\ d'$ over the partitions $f f'$ it is brought into intimate contact with the heating-flues $b\ b'\ b^2$, and is discharged into the tuyeres at a very high temperature.

In order to prevent escape of the blast from the blast-chamber of the stove into the combustion-chamber or into the chimney-stack at $c$ or $c'$, it is necessary to make the hearth or bottom of the stove quite air-tight. I do this by covering it with a cast-iron plate, $i$, which is provided with holes through which the branches of the flues $b\ b^2$ may pass. These flues pass through the holes in the iron plate, and rest on it by means of flanges or shoulders, as shown in Fig. 1. The plate $i$ is covered with one or more layers of fire-brick, $i'$, and over the latter is spread sand to the depth of a few inches, as shown at $i^2$ in the same figure.

The blast is prevented from escaping through the side wall of the stove by a sheet-iron mantel, $k$, which completely surrounds it, and is made to join with the iron bed-plate $i$. This mantel does not form part of my invention. The parts $b\ b^2$ of the flues may be made of continuous tubes of fire-clay, or, if desired, they may be made in sections joined together, as shown, at the joints between the arch $b'$ and the vertical legs $b\ b^2$. In such case their joints should be well tamped with fire-clay mixed with some suitable flux. For convenience in having access to the interior of the stove, and for the purpose of removing a blast-pipe or any of its sections in case of needed repairs, the roof of the stove may be provided with one or more doors, $l$, made of the same refractory material as the arch of the stove, and hinged or otherwise removably secured in place.

I will now describe the modification shown in the second sheet of the drawings, in which the same principle of construction is applied. In it the combustion-chamber $a$ is placed on one side of the stove instead of at the middle, as in Fig. 1. A chamber, $b''$, is formed at the crown of the stove by means of a partition or ceiling, $n$, made of suitable refractory material and extending across the whole of the stove. Flues $b\ b\ b$, in any desirable number, extend from the combustion-chamber $a$ upward and into the chamber $b''$, where they are left open. On the other side of the stove from the combustion-chamber, and underneath the hearth $i$, is a discharge-flue, $c$, which communicates with the usual chimney-stack. The vertical flue-pipe $b^2\ b^2\ b^2$ extends from the flue $c$ through the body or blast-chamber of the stove into the chamber $b''$, thereby establishing communication between this chamber and the discharge $c$. The flues $b$ and $b^2$ are made of refractory clay. The gases of combustion are conducted from the combustion-chamber $a$, through the flue-pipes $b$, into the closed chamber $b''$, whence they escape downward through the pipes $b^2$ into the stack at $c$. It is thus evident that the chamber $b''$ is an equivalent of the arched sections $b'$ of the flues shown in Fig. 1 in establishing communication between the exit and adit flue-pipes. The advantages of its use, as compared with the arched pipe-sections, is the greater convenience in removing parts of the pipes which may become broken.

The interior of the stove is divided into two parts, 2 and 3, by a vertical partition, $f$, which extends from the bottom or hearth of the stove to or nearly to the horizontal partition $n$, where it is provided with holes or passages $u$, which make communication between the two parts of the blast-chamber of the stove. At the bottom of the blast-chamber is a flue, $j$, which connects with the furnace-tuyeres, and is perforated with holes $h\ h$, which open into one of the parts, 3, of the blast-chamber, and not into the other part, 2. A blast-pipe, $d$, leads from the blowing-engine into the bottom of the part 2 of the blast-chamber, and the course of the blast is from this pipe upward through the passages $u$ in the partition $f$, and thence downward in the part 3 to the perforations $h$ of the tuyere-flues $j$, through which it goes at a high temperature to the furnace.

The hearth of the blast-chamber 2 3 is made by a cast-iron plate, $i$, covered with fire-clay and sand, or with either separately, as explained with reference to Fig. 1. The partition $n$ must be made air-tight to exclude the blast in the chamber 2 3 from the gases in the chamber $b''$, and at the same time to permit the expansion and contraction of the pipes $b$ $b^2$, which pass through this partition. For these purposes the construction of the partition $n$ is conveniently made as shown in Figs. 3 and 6, in which the partition is covered with a cast-iron plate, $o$, perforated to permit passage of the pipes through it. These perforations should be made of larger diameter than the pipe, and the intervening space packed with asbestos fiber, as at $p$, and over the plate is spread a layer of sand or sand and asbestus. The asbestus packing, being indestructible by heat, will remain permanently in place, and will allow the necessary vertical movement of the flue-pipes within it, while it, together with the sand, will exclude air from the chamber $b''$.

The pipes $b\ b^2$ (shown in Fig. 3) are composed of sections joined together by fire clay and flux, as illustrated in Figs. 7 and 8. They may, however, be made of a single piece. If any of the sections should become displaced or broken, they may be removed by opening the wall of the blast-chamber 2 3. For this purpose it is preferable to make parts of the wall in removable sections, as shown at $t\ t$, which can easily be taken down and replaced. In order that such repairing of the pipe-sections may not be immediately necessary, so as to interfere with the operations of the stove, I provide each of the pipe-flues with a damper, $q$, which is mounted in a slide or ways in the hearth of the stove and at the base of each flue, so that it can be moved to close the flue completely. Sand is then poured into the broken flue upon the damper $q$, as shown at 4 in Fig. 5, thereby shutting off all communication between the flue and the combustion-chamber or stack, as the case may be. When the top of the flue is open, as in the modification illustrated in the second sheet of the drawings, it may be closed by a plug, $b^4$, of refractory material, put through the man-hole 1 in the crown of the stove, and this covered by a heavy cap or lid, $b^3$. (See Fig. 6.)

Figs. 8, 9, and 10 represent a modified form of flue-pipe, which may be used instead of either of those forms before described, and is obviously an equivalent thereof. It consists of single fire-clay pipes divided by a vertical partition or tongue, $s$. The pipes are closed at their upper ends, and the partition does not extend quite the full length of the flues, so that there are formed two passages, $s'\ s^2$, which communicate with each other near the top of the flue. The passage $s'$ is made to connect with the combustion-chamber $a$ and the passage $s^2$ with the discharge-flue or stack $c$. The course of the hot gases is thus made circuitous through the flue, and the latter thereby highly heated.

In order to overcome the porosity of the clay pipes, which will still be apparent even when pressure is applied from the outside, I glaze the flue-pipes on their outer or inner surface with a flux whose melting-point is at a temperature higher than that which is desired to be applied to the blast of the stove, so that it may not fuse and leave the pipes unprotected.

I do not desire to limit the application of my improvement to metallurgical operations, but wish to include the construction of this apparatus for chemical operations, because it may be used not only in connection with coke-ovens, but other furnaces, and is especially useful in chemical operations for heating chlorine or other gases whose corrosive properties are highly destructive to the metal flues now in common use.

I do not desire to claim, broadly, a heating-stove in which the products of combustion or heating medium pass through flues formed of fire-clay brick, while the blast passes around said flues; nor do I desire to claim, broadly, protecting-flues in such stoves by an outer coating of refractory material; nor do I desire to claim, broadly, pipes or tubes formed of fire-clay, as they are now used in heating-stoves; but

What I claim as my invention, and desire to secure by Letters Patent, is—

The combination, in a hot-blast stove having fire-clay flue pipes or tubes for the circulation of the heating medium within the stove and discharging it out of the same, of a chamber or chambers into which the said flue-pipes open, a fire-box, and a series of adit flue-pipes connecting the fire-box with the chamber or chambers, and a series of discharge flue-pipes connecting the chamber or chambers with a discharge-outlet, and a blast-chamber surrounding said flue-pipes, substantially as and for the purpose described.

In testimony whereof I have hereunto set my hand this 5th day of January, A. D. 1885.

HERMANN SCHULZE-BERGE.

Witnesses:
 THOMAS W. BAKEWELL,
 W. B. CORWIN.